United States Patent
Takeuchi et al.

(10) Patent No.: US 6,855,908 B2
(45) Date of Patent: Feb. 15, 2005

(54) GLASS SUBSTRATE AND LEVELING THEREOF

(75) Inventors: Masaki Takeuchi, Nakakubiki-gun (JP); Yukio Shibano, Nakakubiki-gun (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 18 days.

(21) Appl. No.: 10/125,519

(22) Filed: Apr. 19, 2002

(65) Prior Publication Data

US 2002/0179576 A1 Dec. 5, 2002

(30) Foreign Application Priority Data

Apr. 20, 2001 (JP) .................................... 2001-122369

(51) Int. Cl.[7] ............................................... B23K 9/00
(52) U.S. Cl. ................................ 219/121.4; 219/121.41
(58) Field of Search ....................... 219/121.11, 121.36, 219/121.39, 121.4, 121.41, 121.42, 121.43, 405; 392/390, 416; 430/5, 322, 393; 428/426, 428; 204/298.31

(56) References Cited

U.S. PATENT DOCUMENTS

| | | | |
|---|---|---|---|
| 4,515,652 A | 5/1985 | Gimpelson et al. | |
| 4,632,898 A | * 12/1986 | Fister et al. | ................. 430/313 |
| 5,254,830 A | 10/1993 | Zarowin et al. | |
| 5,444,217 A | * 8/1995 | Moore et al. | ............... 219/405 |
| 2002/0155361 A1 | * 10/2002 | Takeuchi et al. | ............... 430/5 |

FOREIGN PATENT DOCUMENTS

| | | |
|---|---|---|
| EP | 0 317 794 A2 | 5/1989 |
| EP | 0 514 046 A1 | 11/1992 |
| JP | 5160074 A | 6/1993 |
| JP | 10273788 A | 10/1998 |

OTHER PUBLICATIONS

Patent Abstracts of Japan, vol. 1999, No. 01, published Oct. 13, 1998.

* cited by examiner

*Primary Examiner*—Tu Hoang
(74) *Attorney, Agent, or Firm*—Millen, White, Zelano & Branigan, P.C.

(57) ABSTRACT

A glass substrate having a surface which has been leveled, preferably to a flatness of 0.04–1.3 nm/cm$^2$ of the surface, by local plasma etching is provided. A glass substrate whose surface carries microscopic peaks and valleys is leveled by measuring the height of peaks and valleys on the substrate surface, and plasma etching the substrate surface while controlling the amount of plasma etching in accordance with the height of peaks.

11 Claims, 2 Drawing Sheets

GLASS SUBSTRATE AND LEVELING THEREOF

This invention relates to glass substrates which are useful as silica glass substrates for reticles used in the most advanced application among semiconductor-related electronic materials, and silica glass substrates or silica glass chips which are expected to find wide-spreading use in the fields of microelectronics, micro-optics and microanalyses; and a method for leveling the surface thereof.

BACKGROUND OF THE INVENTION

Quality parameters of photomask-forming silica glass substrates include the size of defects, the density of defects, flatness, surface roughness, the opto-chemical stability of material, and the chemical stability of surface. Of these parameters, the quality relating to the flatness on substrates is more strictly required to comply with the trend of ICs toward finer-circuitry. It is highly probable that the design rule of interconnection to be transferred to silicon wafers will fall below 100 nm. Then, silica glass substrates for photomasks must have a flatness below 0.3 $\mu$m for the 6025 substrate (152 mm by 152 mm by 6.35 mm). Specifically, when a wiring pattern on a photomask is optically transferred to a silicon wafer, the exposure surface is desired to be as flat as possible. The flatness of the exposure surface is correlated to many factors including the material and thickness of a light-shielding film, the type of wiring pattern and the location within the exposure system although the flatness of glass substrate is one of predominant factors. If the design rule of interconnection is reduced to below 100 nm in the future and the 6025 substrate yet has a flatness in excess of 0.3 $\mu$m, then the critical dimension (CD) accuracy of the wiring pattern transferred to the silicon wafer exceeds the permissible range. This leads to a failure to establish fine-circuitry devices.

The current technology of leveling or flattening silica glass substrates for photomasks is an extension of the traditional polishing technology. The surface flatness achievable with the current technology is on the average about 0.5 $\mu$m at best for the 6025 substrate. Substrates having a flatness of less than 0.5 $\mu$m can be obtained, but in very low yields. This is because in the traditional polishing technology, it is possible to roughly control the polishing rate over the entire surface of a substrate, but it is impossible in a practical sense to specify a leveling recipe for each of starting substrates in accordance with their shape and individually polish the substrates for evening out irregularities. Also, when double-sided lapping on a batchwise basis is used, for example, it is very difficult to control variations within each batch and between batches. When single-side lapping on a single-wafer basis is used, a difficulty arises in that variations occur in conformity to the shape of starting substrates. In either case, it is difficult to consistently manufacture substrates with improved surface flatness.

SUMMARY OF THE INVENTION

An object of the invention is to provide a glass substrate having an improved surface flatness and a glass substrate leveling method ensuring that a glass substrate having a fully flat surface is easily obtainable.

It has been found that when a starting glass substrate having a surface carrying microscopic peaks and valleys is plasma etched locally at the peaks while controlling the amount of plasma etching in accordance with the heights of peaks, there is obtained a glass substrate having an improved flatness, specifically a flatness of 0.04 nm to 1.3 nm per square centimeter of the surface. In the case of the 6025 substrate (152 mm by 152 mm by 6.35 mm) which is the mainstream among photomask substrates, for example, substrates having a flatness of 0.01 $\mu$m to 0.3 $\mu$m can be provided.

The technique of processing material surfaces by plasma etching is found, for example, in JP-A 5-160074. However, this technique is applicable to only silicon wafers. Its object is to eliminate variations in thickness of material, different from the present invention's object of leveling out the surface of glass substrates. JP-A 10-273788 discloses a technique of processing quartz glass using a plasma. This relates to the means for producing complex surfaces such as aspheric lenses and differs in object and field from the technique of leveling out the surface of glass substrates such as photomask substrates.

In one aspect, the invention provides a glass substrate having a surface which has been leveled by local plasma etching.

Preferably, the surface of the glass substrate has a flatness of 0.04 to 1.3 nm per square centimeter of the surface. The glass substrate is most often a silica glass substrate and has dimensions of 152±0.2 mm by 152±0.2 mm by 6.35±0.1 mm.

In another aspect, the invention provides a method for leveling a surface of a glass substrate, the surface carrying microscopic peaks and valleys, the method comprising the steps of measuring the heights of peaks and valleys on the substrate surface, and plasma etching the substrate surface while controlling the amount of plasma etching in accordance with the heights of peaks.

DESCRIPTION OF THE PREFERRED EMBODIMENTS

The invention employs a plasma etching technique as the means for producing high-flatness glass substrates. The starting glass substrate has a surface carrying microscopic irregularities, that is, peaks and valleys. The first step is to measure the heights of peaks and valleys on the substrate surface. In the second step, plasma etching is carried out on the substrate surface while controlling the amount of plasma etching in accordance with the heights of peaks, specifically locally changing the amount of plasma etching (i.e., amount of substrate glass etched away) so that a more amount of substrate glass may be etched away in an area of a high peak height and a less amount of substrate glass be etched away in an area of a low peak height.

Specifically, a plasma generating housing is positioned above a peak site on the glass substrate surface where plasma etching is carried out. Neutral radical species generated in the plasma isotropically attack the glass substrate surface at that site whereby the close area around that site is etched away. In areas of the glass substrate surface outside the plasma generating housing, no plasma is generated and no etching takes place even though some etchant gas strikes against the surface. When the plasma generating housing is moved above the starting glass substrate, the rate of movement of the housing is controlled in accordance with the heights of peaks on the starting glass substrate so that a glass substrate having excellent flatness is eventually obtainable.

It is necessary that the surface shape or topography of the starting glass substrate be previously determined, that is, the heights of peaks and valleys on the glass substrate surface be previously measured. Surface shape measurement may be done by any methods. It is desired in view of the target flatness that such measurement be of high precision, and thus, an optical interference method is a typical measurement. In accordance with the surface shape or the heights of peaks, the rate of movement of the plasma generating housing is computed. Then the rate of movement is controlled to be slow in an area of a high peak height so as to provide a more etching amount.

The plasma generating housing may be of any structure. In one exemplary system, the glass substrate is sandwiched between a pair of electrodes, a plasma is created between the substrate and the electrode by application of a radio frequency power, and an etchant gas is flowed therethrough to generate radical species. In another system, an etchant gas is passed through a waveguide where a plasma is created by microwave oscillation, and the flow of radical species thus generated is impinged against the substrate surface. The etchant gas is selected depending on the identity of glass substrate. For silica glass substrates for photomasks, a halide gas or a gas mixture containing a halide gas is preferred. The halide gas is exemplified by methane tetrafluoride, methane trifluoride, ethane hexafluoride, propane octafluoride, butane decafluoride, hydrogen fluoride, sulfur hexafluoride, nitrogen trifluoride, carbon tetrachloride, silicon tetrafluoride, methane trifluoride chloride and boron trichloride.

To control the rate of movement of the plasma generating housing in accordance with the heights of peaks on the surface of the starting glass substrate as mentioned above, a computer may be used. Since the movement of the plasma generating housing is relative to the substrate, the substrate itself may be moved instead.

The glass substrate thus processed reaches a very high degree of flatness. The desired flatness is, though not limited to, 0.04 nm to 1.3 nm, especially 0.04 nm to 0.86 nm per square centimeter of the substrate surface. The glass substrate is preferably dimensioned 152±0.2 mm by 152±0.2 mm by 6.35±0.1 mm (named 6025 substrate). In the case of 6025 substrates which are most often used as the photomask-forming glass substrate, a high flatness glass substrate having a flatness of 0.01 $\mu$m to 0.3$\mu$m can be obtained.

Under certain plasma etching conditions, the surface of the glass substrate thus obtained can have surface roughness or a work-degraded layer. In such a case, if necessary, the plasma etching may be followed by a very short time of polishing which does bring substantially little change of flatness.

Preferred for the measurement of flatness from the standpoint of measurement precision is an optical interference method in which coherent light (matched phase relationship) as typified by laser light is directed to the substrate surface and reflected thereby, and a difference in height of substrate surface points is observed as a phase shift of reflected light.

The invention provides a glass substrate having a high flatness, specifically a flatness of 0.04 nm to 1.3 nm/cm$^2$ of the substrate surface, which is suited for use as silica glass substrates for photomasks used in the photolithography of great interest in the fabrication of ICs, and silica glass substrates and silica glass chips which are expected to find wide-spreading use in the fields of microelectronics and microanalyses. The invention thus contributes to the achievement of finer patterns in the semiconductor field and a further advance of the micro-system field.

EXAMPLE

Figure 1:
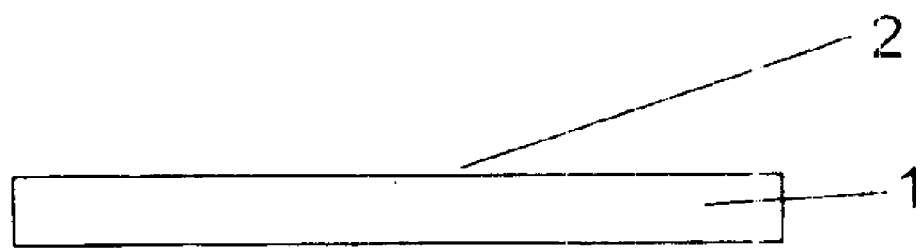
FIG. 1 - demonstration of a glass substrate (1) having a surface (2).
Figure 2:
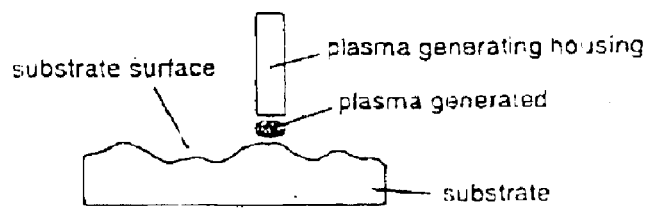
FIG. 2 - demonstration of a setup according to the invention.
Figure 3:
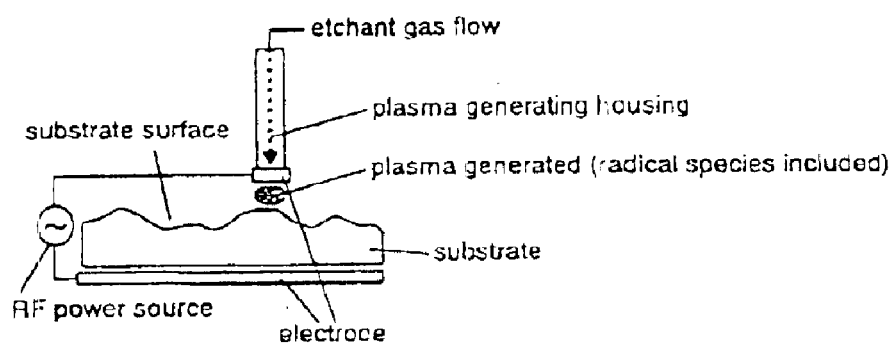
FIG. 3 - demonstration of another setup according to the invention.
Figure 4:
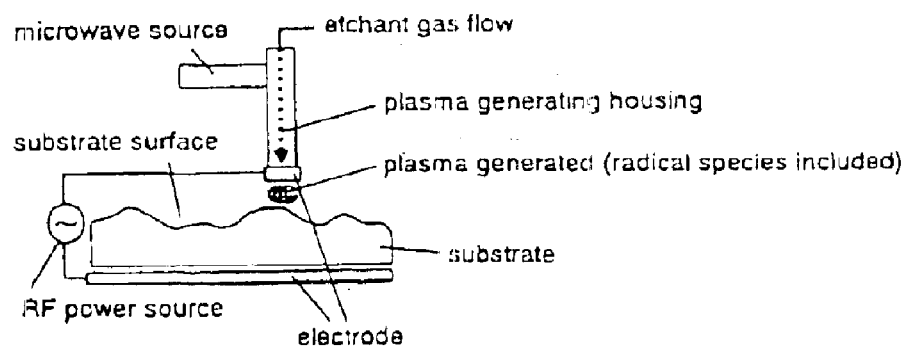
FIG. 4 - demonstration of yet a further setup according to the invention.

Examples of the invention are given below by way of illustration and not by way of limitation.

Example 1

The starting substrate used was a quartz substrate having a pair of square surfaces of 152 mm by 152 mm and a thickness of 6.35 mm.

One surface of the quartz substrate was measured by an optical interference flatness meter, finding a flatness of 3.7 nm/cm$^2$ of the surface. Based on the thus obtained data about microscopic peaks and valleys on the substrate surface, the rate of movement of a plasma generating housing which was located above the substrate was computed. Plasma etching was carried out on the substrate surface by moving the plasma generating housing along the substrate surface at the controlled rate. The plasma generating housing of high-frequency type (150 W) had cylindrical electrodes of 75 mm diameter. The etchant gas used was methane tetrafluoride. After plasma etching was carried out over the entire substrate surface, that surface of the quartz substrate was measured again by the optical interference flatness meter, finding a flatness of 0.21 nm/cm$^2$ of the surface.

Examples 2–9

As in Example 1, quartz substrates having surfaces with different flatness values were plasma etched, obtaining quartz substrate having surfaces leveled. The flatness values per square centimeter of the surface before and after plasma etching are shown in Table 1.

TABLE 1

| | Example | | | | | | | |
|---|---|---|---|---|---|---|---|---|
| | 2 | 3 | 4 | 5 | 6 | 7 | 8 | 9 |
| Initial flatness (nm) | 5.2 | 4.0 | 2.3 | 3.2 | 3.3 | 4.1 | 2.9 | 1.5 |
| Flatness after plasma etching (nm) | 0.74 | 0.48 | 0.17 | 0.39 | 0.52 | 0.82 | 0.39 | 0.04 |

The invention ensures that quartz substrates having a surface leveled to a flatness of 0.04–1.3 nm/cm$^2$ of the surface are readily produced.

Japanese Patent Application No. 2001-122369 is incorporated herein by reference.

Reasonable modifications and variations are possible from the foregoing disclosure without departing from either the spirit or scope of the present invention as defined by the claims.

What is claimed is:

1. A method for leveling a surface of a glass substrate, the surface carrying microscopic peaks and valleys, the method comprising the steps of:

measuring the heights of peaks and valleys on the substrate surface, and plasma etching the substrate surface while controlling the amount of plasma etching in accordance with the heights of peaks.

2. A method according to claim 1, wherein a plasma generating housing is positioned above a peak on the glass substrate surface where plasma etching is carried out.

3. A method according to claim 1, wherein the glass substrate is sandwiched between a pair of electrodes, a plasma is created between the substrate and one of the pair of electrodes by application of a radio frequency power, and an etchant gas is flowed therethrough to generate radical species.

4. A method according to claim 1, wherein an etchant gas is passed through a waveguide where a plasma is created by microwave oscillation, and a flow of radical species thus generated is impinged against the substrate surface.

5. A method according to claim 1, wherein etching is performed by an etchant gas.

6. A method according to claim 5, wherein the etchant gas is a halide gas or a gas mixture containing a halide gas.

7. A method according to claim 5, wherein the etchant gas is methane tetrafluoride, methane trifluoride, ethane hexafluoride, propane octafluoride, butane decafluoride, hydrogen fluoride, sulfur hexafluoride, nitrogen trifluoride, carbon tetrachloride, silicon tetrafluoride, methane trifluoride chloride or boron trichloride.

8. A method according to claim 2, wherein controlling the amount of plasma etching in accordance with the heights of peaks comprises controlling the rate of movement of the substrate surface in relation to the plasma generating housing.

9. A method according to claim 8, wherein controlling the rate of movement of the substrate surface in relation to the plasma generating housing is such that the rate of movement is slower in an area of a higher peak when compared to the rate of movement in an area of a lower peak.

10. A method according to claim 8, wherein the substrate surface is moved.

11. A method according to claim 8, wherein the plasma generating housing is moved.

* * * * *